Oct. 4, 1966    A. S. PLEIN    3,276,101
ADJUSTABLE CUTTING TOOL
Original Filed Feb. 4, 1964
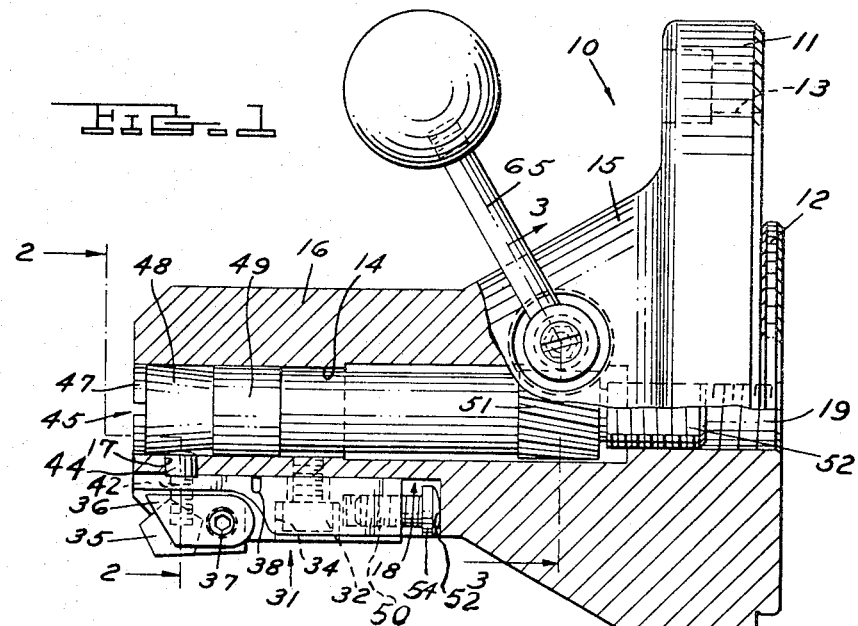
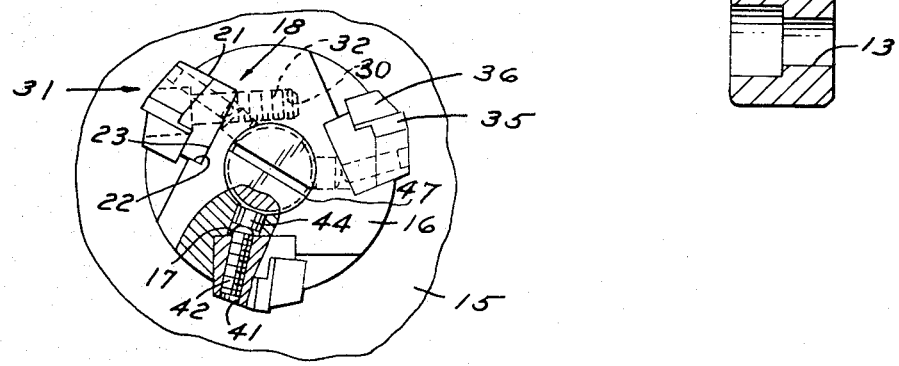
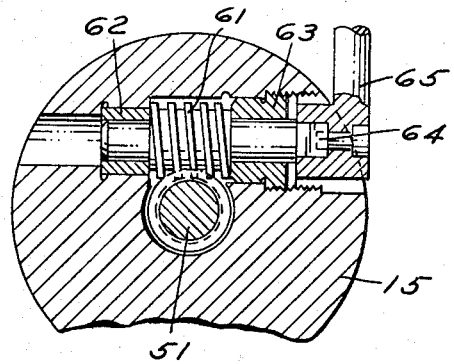
INVENTOR.
ARNOLD S. PLEIN
BY Bower & Patalidis
ATTORNEYS

United States Patent Office 3,276,101
Patented Oct. 4, 1966

3,276,101
ADJUSTABLE CUTTING TOOL
Arnold S. Plein, Detroit, Mich., assignor to Ex-Cell-O Corporation, Detroit, Mich., a corporation of Michigan
Continuation of application Ser. No. 342,361, Feb. 4, 1964. This application Dec. 22, 1965, Ser. No. 515,616
1 Claim. (Cl. 29—105)

This application is a continuation of prior application Serial No. 342,361, filed February 4, 1964 and now abandoned.

This invention in general relates to cutting or boring tools and more specifically to a novel cutting head having one or more radially disposed cutting tools or cartridges mounted thereon.

In recent years, because of the advent of so-called throw-away tool tips or cutting inserts, and of the general acceptance of adjustable cutting heads for machine tools and more particularly for boring machines which must hold very close tolerances, refinements in the precision of adjustment of such tools have become of considerable importance. Adjustment arrangements for tools as are generally found in the prior art often consist of cam member means adjusted by turning the end of a center spool with a hex head wrench or screwdriver. Such arrangements have proved to be satisfactory in many cases; however, more precision and repeatability have been desired. Also such arrangements result in a lack of fast adjustment because the tool must be completely withdrawn so that the operator may get to the end of the spindle to adjust the cutter head.

It is one object of the present invention to provide a boring tool adjusting means which may be reached from the side of the tool without requiring access to the end of the tool.

Another object of the present invention is to provide an easily adjustable tool arrangement which allows a fine adjustment of the cutter size without requiring a high degree of skill by the person making the adjustment.

Also another object of the present invention is to provide an adjusting means for one or more radially disposed cutting tools or cutting cartridges which is endowed with great repeatability and great ease of access by the operator.

A further object of the present invention is to provide a cutting tool structure capable of accomplishing the aforementioned objects with a minimum of material cost and fabrication expense and, at the same time, being composed of simple and ruggedly built parts which are very reliable in operation.

Other objects and advantages of the invention will become apparent from the following detailed description and claim taken in conjunction with the accompanying drawings in which like reference numerals are used to indicate like parts in the various views.

FIG. 1 is a partial longitudinal sectional view of an illustrative cutter head embodying the invention;

FIG. 2 is an end view of the cutter head shown in FIG. 1 with a portion cut away to show a detail of internal configuration as seen from line 2—2 of FIG. 1; and FIG. 3 is a partial cross section of the adjusting means taken on line 3—3 of FIG. 1, and looking in the direction of the arrows.

While the invention is susceptible of various modifications in alternative constructions, certain illustrative embodiments are shown in the drawings and will be described hereinafter in considerable detail. It should be understood, however, that there is no intention to limit the invention to the specific form disclosed. On the contrary, the intention is to cover all modifications, alernate and equivalent constructions falling within the spirit and scope of the invention as expressed in the appended claim.

Referring generally to the drawings and more particularly to FIGS. 1 and 2 thereof, a cutter head assembly 10 is provided with a mounting flange 11 having a locating hub 12 and securing slots 13 disposed radially around the mounting flange 11. The portion of the cutter head assembly 10 forward of the flange 11 consists of a support portion 15 integral with, or connected to, a tool support member 16.

The tool support member 16 is provided with a longitudinally disposed inner bore 14 and positioned slots 18 which longitudinally extend substantially parallel to the axis of the tool support member 16. Each slot 18 has two side walls 21 and 22 and a bottom surface 23. A tool cartridge 31 is disposed in each slot 18 and clamped by means such as screw 32 passing diagonally through an aperture 34 in the cartridge 31. Screw 32 engages a threaded bore 30 angularly disposed in the body of the tool support member 16 so as to firmly apply the bottom surface and the side surface of the cartridge respectively against the bottom surface 23 and the side wall 21 which faces the direction of cutting of the tool. A set screw 50 is housed in the end of the tool cartridge 31 and the distance by which the set screw 50 is threaded into the cartridge permits adjustable longitudinal positioning of the tool cartridge by engagement of the head 51 of the set screw with the back wall 52 of the slot 18. Aperture 34 which houses clamping screw 32, is elongated so that the tool cartridge 31 may be longitudinally positioned wherever required by means of set screw 33 before being secured by means of clamping screw 32.

The other end of tool cartridge 31 supports a cutter insert 35 which is held in position in a conventional manner by means of clamp 36 and locking screw 37. A saw cut 38 enables the end of the tool cartridge on which is mounted the cutter insert 35 to flex in relation to the portion of the cartridge body firmly secured in the slot 18 by means of the clamping screw 32.

The tool cartridge 31 is also provided with a substantially radially disposed threaded bore 41 proximate the end mounting the cutter insert 35. A radial adjusting member 42 is threaded into the bore 41, and transfer pin 44, housed in a substantially radial bore 17 disposed in the tool support member 16 between the inner bore 14 and is adapted to normally engage the radial adjusting member 42. The inner bore 14 houses adjusting element or draw bar generally designated by numeral 45. The adjusting element 45 is provided, as seen in FIG. 1 with a first journal end 47 bearing upon the surface of inner bore 14, a conical surface portion 48, and a second journal surface 49 also bearing upon the inner bore 14. The adjusting element or draw bar 45 is also provided, on its other end with a threaded shank 52 cooperating with the threaded portion 19 of the longitudinal inner bore 14 situated proximate the mounting flange 11.

As best seen in FIG. 3, a gear wheel 51, integral with, or keyed upon the adjusting element or draw bar 45 is disposed intermediate the threaded shank 52 and the conical surface portion 48 of the said adjusting element or draw bar and is capable of being driven by a worm 61 journalled in straight bushing 62 and threaded rib bushing 63 disposed along an axis substantially transversal in the body of the tool support member 16. The worm 61 has a driving head 64 provided with a detachable handle 65. It is obvious, however, that any other convenient means of driving worm 61 could be used instead of the arrangement just described such as, for example, with appropriate screw driver slot or wrench drive which could be permanently secured to the cutter head assembly.

Coarse or fine adjustment may be designed into the tool of the invention according to the lesser or greater number of teeth on gear wheel 51 and the amount of taper or form of the cam surface 48. Furthermore, the invention provides for many built-in self-locking features such as, for example, the transfer pin 44 pressing against the surface 48, thus braking any rotational force upon the adjusting element 45. The worm 61 and gear wheel 51 also acts as a locking means in being composed of elements which may be driven only in one direction, because the worm-gear combination permits the gear to be driven by the worm and not the inverse. The threaded shank 52 engaging all the time bore 19 forces the adjusting element or draw bar 45 to maintain its axial and radial position. All these self-locking provisions not only maintain the complete assembly in its adjusted position, but also allow the tool assembly to be adjusted without first loosening locking means which would require tightening subsequently to adjustment of the tool.

It can be seen from the preceding description that the tool of the invention provides for simultaneous and substantially equal adjustment of all the tool cartridges 31 by rotation of the adjusting element or draw bar 45 by means of worm 61, thus causing the cam surface 48 to affect the radial position of transfer pins 44 in radial bores 17. Because the transfer pins 44 engage radial adjusting members 42 secured in threaded bores 41 of the tool cartridges 31, each end of the tool cartridges 31 bearing the cutter inserts 35 is in turn caused to flexibly pivot radially with respect to the tool support member 16 around a fulcrum point approximately situated at the same cut slot 38. After all the cutter inserts 35 have been manually adjusted uniformly both axially by means of set screws 33, and radially by means of radial adjusting member 42, any longitudinal axial movement of adjusting element 45 causes uniform axial motion of all the tool cartridge ends bearing the cutter inserts 35.

The adjusting mechanism of the invention allows to control the radial movement of the tool cutter inserts 35. If, for example, gear wheel 51 is designed with forty teeth and worm 61 has a lead equal to the circular pitch of the gear wheel, forty revolutions of the driving head 64 and worm 61 result in one revolution of the draw bar or adjusting element 45. Therefore, one complete revolution of adjusting head 64 transmits 1/40 of a revolution to the adjusting element 45. The resulting deflection of the flexible end portion of the tool cartridges 31 bearing the cutter inserts 35 can thus be controlled in any infinitesimal and precise amount depending of course also upon the amount of conicity of the cam surface 48 and the distance and direction the adjusting element 45 is axially displaced, thus depending also on the lead of the threaded shank 52.

Several variations of the invention could easily be adapted such as providing for the cam surface 48 engaging directly or through intermediary means a plurality of cutting tools disposed in substantially radial apertures. Such an arrangement is commonly used in industry and is familiar to persons skilled in the art, as evidenced by United States Letters Patent No. 2,712,686, issued July 12, 1958.

While the embodiment of the present invention herein disclosed constitutes the preferred form, it is to be understood that such embodiment has been herein described for illustrative purpose only, and many variations and changes may be introduced to the invention without departing from the spirit and scope of the appended claim.

What is claimed as new is:
An adjustable cutting tool comprising:
a tool support member of circular cross section;
a plurality of generally radially disposed slots extending longitudinally at one end of said tool support member and regularly arranged around the periphery thereof;
each of said slots having a bottom surface and a pair of sidewalls;
a tool cartridge disposed in each one of said slots, said tool cartridge having a cutting insert mounted on one end thereof;
a clamping screw passing obliquely through the body of said tool cartridge and engaging an appropriate threaded hole in the body of said tool support member for firmly maintaining said tool cartridge in said slot by engagement with the bottom surface and the side wall of said slot which normally opposes the cutting forces impressed upon the cartridge;
individual longitudinal adjusting means for each said tool cartridge;
a cut-out slot proximate the end of each tool cartridge mounting the cutting insert and disposed between said end and said clamping screw so as to allow said end to flex relatively to the body of said tool cartridge;
a cylindrical adjusting element disposed in an axial longitudinal bore in the body of said tool support member;
a tapered cam surface on the end of said adjusting element proximate the end of said tool member supporting the tool cartridges;
a threaded portion on the other end of said adjusting element adapted to engage a correspondingly threaded portion of the axial longitudinal bore in the body of the tool support member whereby rotation of said adjusting element causes longitudinal motion of said tapered cam surface;
a gear mounted on said adjusting element intermediate both ends;
a worm engaging said gear;
manual means for rotating said worm for causing said adjusting element to be rotated so as to longitudinally displace said tapered cam surface; and
individual radial adjusting means operatively connected to each one of said tool cartridges and engaging said tapered cam surface for causing uniform radial flexing of all the ends of said tool cartridges mounting the cutting inserts;
said radial adjusting means comprising screw adjusting means for effecting individual radial adjustment of the ends of each one of said tool cartridges.

References Cited by the Examiner

UNITED STATES PATENTS

| | | |
|---|---|---|
| 1,233,683 | 7/1917 | Mertes. |
| 2,223,041 | 11/1940 | Maxwell. |
| 2,272,200 | 2/1942 | Hogg _____ 29—105 X |
| 2,979,974 | 4/1961 | Craig. |
| 2,998,737 | 9/1961 | Yogus. |

WILLIAM W. DYER, Jr., *Primary Examiner.*

HARRISON L. HINSON, *Assistant Examiner.*